US010583992B2

(12) United States Patent
Clark et al.

(10) Patent No.: US 10,583,992 B2
(45) Date of Patent: Mar. 10, 2020

(54) STUB AXLES CONVEYOR ROLLERS (71) Applicant: FRANTZ MANUFACTURING COMPANY, Sterling, IL (US)

(72) Inventors: James Clark, Sterling, IL (US); Douglas Crowder, Jr., Sterling, IL (US); Timothy Powell, Sterling, IL (US); John Gvozdjak, Sterling, IL (US)

(73) Assignee: FRANTZ MANUFACTURING COMPANY, Sterling, IL (US)

( * ) Notice: Subject to any disclaimer, the term of this patent is extended or adjusted under 35 U.S.C. 154(b) by 0 days.

(21) Appl. No.: 16/276,111

(22) Filed: Feb. 14, 2019

(65) Prior Publication Data

US 2019/0263598 A1 Aug. 29, 2019

Related U.S. Application Data (60) Provisional application No. 62/634,512, filed on Feb. 23, 2018.

(51) Int. Cl.
*B65G 39/02* (2006.01)
*B65G 39/12* (2006.01)

(52) U.S. Cl.
CPC ............. *B65G 39/02* (2013.01); *B65G 39/12* (2013.01)

(58) Field of Classification Search
CPC ................................ B65G 39/12; B65G 39/02
USPC ......................................................... 193/37
See application file for complete search history.

(56) References Cited

U.S. PATENT DOCUMENTS

| 1,362,910 | A | * | 12/1920 | Zoeller ................. | B65G 39/09 384/546 |
| 2,768,725 | A | | 10/1956 | Foulds et al. | |
| 3,353,644 | A | | 11/1967 | McNash et al. | |
| 3,931,878 | A | * | 1/1976 | Payne .................... | B65G 39/09 193/37 |
| 4,148,386 | A | * | 4/1979 | Bradbury .............. | B65G 39/09 193/37 |
| 4,213,523 | A | * | 7/1980 | Frost ..................... | B65G 39/09 193/37 |
| 4,486,056 | A | * | 12/1984 | Brandenstein ........ | B65G 39/09 384/477 |
| 5,421,441 | A | | 6/1995 | Mason | |
| 5,645,155 | A | | 7/1997 | Houghton | |
| 5,865,290 | A | | 2/1999 | Scott et al. | |
| 6,053,298 | A | | 4/2000 | Nimmo et al. | |
| 6,076,647 | A | * | 6/2000 | Agnoff ................. | B65G 39/12 193/35 R |
| 6,209,702 | B1 | | 4/2001 | Agnoff | |
| 6,516,942 | B2 | | 2/2003 | East | |
| 6,554,117 | B2 | | 4/2003 | Henson et al. | |
| 6,702,091 | B2 | | 3/2004 | Nimmo et al. | |

(Continued)

OTHER PUBLICATIONS

1805 GenII Semi-Precision Bearing, Frantz (Publicly available prior to the filing date of the subject application).

(Continued)

*Primary Examiner* — Mark A Deuble
(74) *Attorney, Agent, or Firm* — Barnes & Thornburg LLP (57) ABSTRACT

A conveyor includes a frame and a plurality of rollers coupled to the frame. Each roller includes a tube, bearings coupled to opposing ends of the tube, and at least one axle engaged with the bearings and the frame to support the roller for rotation relative to the frame.

21 Claims, 5 Drawing Sheets

(56) References Cited

U.S. PATENT DOCUMENTS

| | | | |
|---|---|---|---|
| 6,726,003 B2 * | 4/2004 | Itoh | B65G 39/12 |
| | | | 193/35 R |
| 7,028,825 B2 | 4/2006 | Scott | |
| 2004/0159528 A1 | 8/2004 | Wolf | |
| 2010/0038214 A1 * | 2/2010 | Keys | B65G 15/60 |
| | | | 198/829 |
| 2012/0285802 A1 | 11/2012 | Scott et al. | |

OTHER PUBLICATIONS

Product Details, Pro-Hawk Corporation (Jan. 2008).
Roller Catalog, Omni Metalcraft Corp., (May 2013).

* cited by examiner

STUB AXLES CONVEYOR ROLLERS

PRIORITY CLAIM

This application claims priority under 35 U.S.C. § 119(e) to U.S. Provisional Application Ser. No. 62/634,512, filed Feb. 23, 2018, the disclosure of which is expressly incorporated by reference herein in its entirety.

BACKGROUND

The present disclosure relates to conveyors, and particularly to conveyors having rollers mounted on a frame. More particularly, the present disclosure relates to axles used to support rollers on a conveyor frame and allow rotation of the rollers relative to the frame.

SUMMARY

According to the present disclosure, a conveyor includes a frame and a plurality of rollers coupled to the frame. Each roller includes a tube, bearings coupled to opposing ends of the tube, and at least one axle engaged with the bearings and the frame to support the roller for rotation relative to the frame.

In illustrative embodiments, a male stub axle engages with one of the bearings and a female stub axle engages with the other bearing. The male stub axle is received through the frame to support a first end of the roller on the frame. The female stub axle engages with a fastener extending through the frame to support a second opposite end of the roller on the frame.

In illustrative embodiments, the male stub axle includes a first stem, a head, and a first flange positioned between the stem and the head. The first stem has an outer profile matching an inner profile of a receiver of the bearings. The head has a threaded surface for engaging with a fastener to secure the male stub axle with the frame.

In illustrative embodiments, a locator coupled to the first flange extends toward the head and engages with a hole in the frame to locate the male stub axle relative to the frame. A beveled end of the first stem aligns the male stub axle with the bearing during insertion of the first stem into the receiver. An outer profile of the first flange allows a tool to engage with the male stub axle to block rotation thereof while securing to the frame. The first stem has an outer profile matching an inner profile of a receiver of the bearings.

In illustrative embodiments, the female stub axle includes a second stem, a second flange coupled to the second stem, and a bore extending through the second stem and the second flange. The second stem has an outer profile matching an inner profile of a receiver of the bearings. The bore has a threaded surface for engaging with a fastener to secure the female stub axle with the frame.

In illustrative embodiments, a locator coupled to the second flange extends away from the second stem and engages with a hole in the frame to locate the female stub axle relative to the frame. A beveled end of the second stem aligns the female stub axle with the bearing during insertion of the second stem into the receiver. An outer profile of the second flange allows a tool to engage with the female stub axle to block rotation thereof while securing to the frame.

BRIEF DESCRIPTION OF THE DRAWINGS

The present disclosure will be described hereafter with reference to the attached drawings which are given as a non-limiting example only, in which.

The exemplification set out herein illustrates embodiments of the disclosure that are not to be construed as limiting the scope of the disclosure in any manner Additional features of the present disclosure will become apparent to those skilled in the art upon consideration of the following detailed description of illustrative embodiments exemplifying the best mode of carrying out the disclosure as presently perceived.

DETAILED DESCRIPTION

While the present disclosure may be susceptible to embodiment in different forms, there is shown in the drawings, and herein will be described in detail, embodiments with the understanding that the present description is to be considered an exemplification of the principles of the disclosure. The disclosure is not limited in its application to the details of structure, function, construction, or the arrangement of components set forth in the following description or illustrated in the drawings. The disclosure is capable of other embodiments and of being practiced or of being carried out in various ways. In addition, it is to be understood that the phraseology and terminology used herein is for the purpose of description and should not be regarded as limiting. The use of various phrases and terms is meant to encompass the items or functions identified and equivalents thereof as well as additional items or functions. Unless limited otherwise, various phrases, terms, and variations thereof herein are used broadly and encompass all variations of such phrases and terms. Furthermore, and as described in subsequent paragraphs, the specific configurations illustrated in the drawings are intended to exemplify embodiments of the disclosure. However, other alternative structures, functions, and configurations are possible which are considered to be within the teachings of the present disclosure. Furthermore, unless otherwise indicated, the term "or" is to be considered inclusive.

Figure 1:
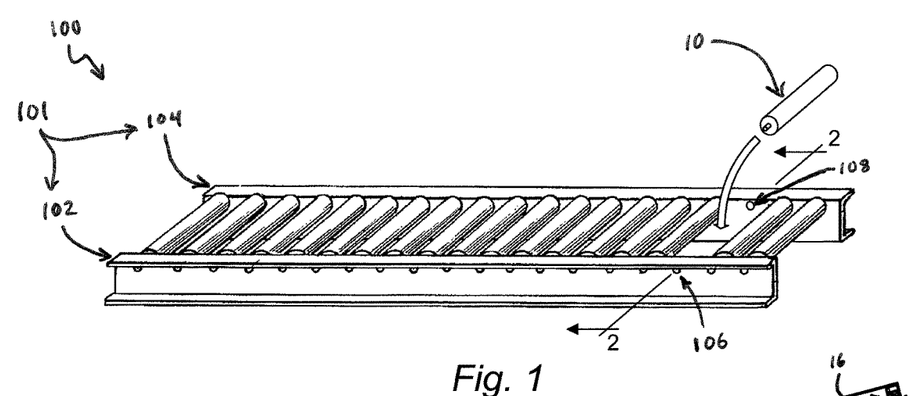
FIG. 1 is a perspective view of a conveyor in accordance with the present disclosure showing the conveyor having a frame and a plurality of rollers coupled to the frame and suggesting that a roller is positioned for attachment to the frame as illustrated in FIGS. 2-4.

A conveyor 100 in accordance with the present disclosure is shown in FIG. 1. Conveyor 100 includes a frame 101 and a plurality of rollers 10 coupled to frame 101. Frame includes spaced apart rails 102, 104 and rollers 10 extend between rails 102, 104. Rollers 10 are arranged to rotate relative to frame 101 for moving items along conveyor 100. Holes 106, 108 are formed through rails 102, 104, respectively, for attachment of rollers 10. In some embodiments, holes 106, 108 can be round, hex shaped, or other polygonal shape.

Figure 2:
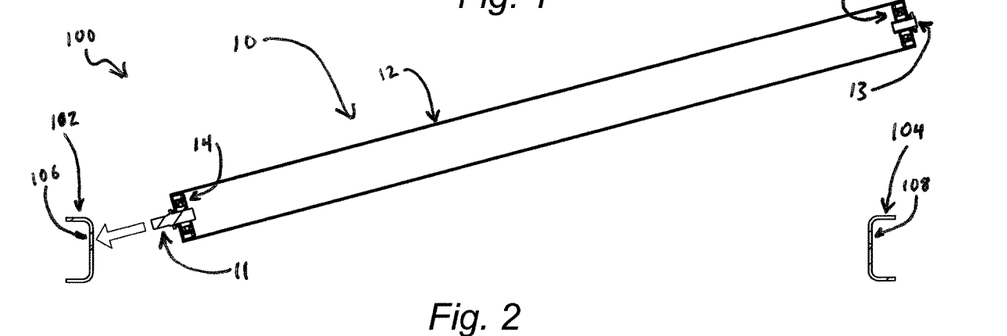
FIG. 2 is sectional view taken along line 2-2 in FIG. 1 showing that the roller includes a tube, bearings coupled to opposing ends of the tube, and male and female stub axles in accordance with the present disclosure coupled to the bearings and suggesting that the roller is position for inserting the male stub axle through a hole in the frame.
Figure 3:
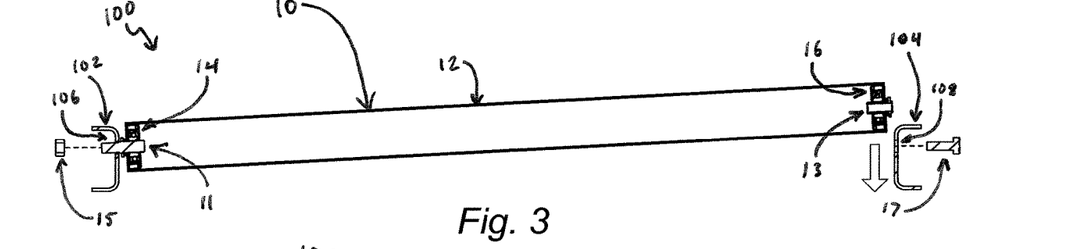
FIG. 3 is a view similar to FIG. 2 showing the male stub axle engaged with the frame and suggesting that the opposing end of the roller is moved to align the female stub axle with another hole of the frame for attachment with a fastener.
Figure 4:
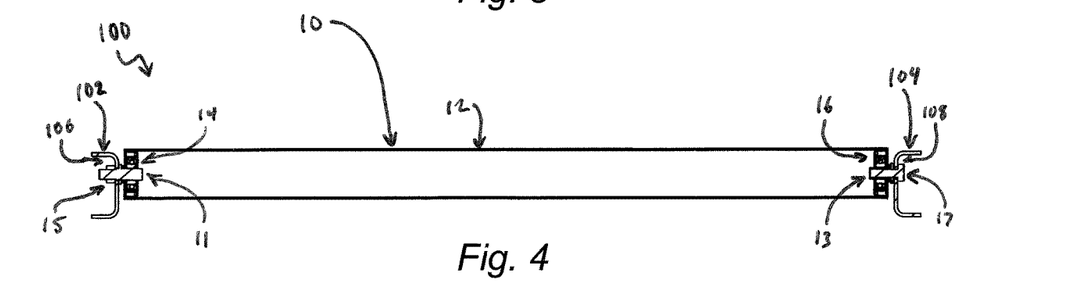
FIG. 4 is a view similar to FIG. 3 showing the roller coupled to the frame and suggesting that the male and female stub axles support the roller for rotation relative to the frame.

Each roller 10 includes a tube 12, bearings 14, 16 coupled to opposing ends of tube 12, and stub axles 11, 13 in accordance with the present disclosure coupled to bearings 14, 16 as shown in FIG. 2. In the illustrative embodiment, stub axle 11 is a male stub axle and stub axle 13 is a female stub axle. In one illustrative process for attaching roller 10 with frame 101, male stub axle 11 is inserted through hole 106 as suggested in FIGS. 2 and 3. Female stub axle 13 is moved to align with hole 108 and engage with a fastener 17 (such as a bolt) for securing female stub axle 13 with rail 104 of frame 101 as suggested in FIGS. 3 and 4. A fastener 15 (such as a nut) engages with male stub axle 11 for securing male stub axle 11 with rail 102 of frame 101. Roller 10 is removed by reversing the process described above. In some embodiments, two male stub axles 11 or two female stub axles 13 are used. In some embodiments, stub axles 11, 13 are part of a mounting kit for use with roller 10.

Figures 5, 6:
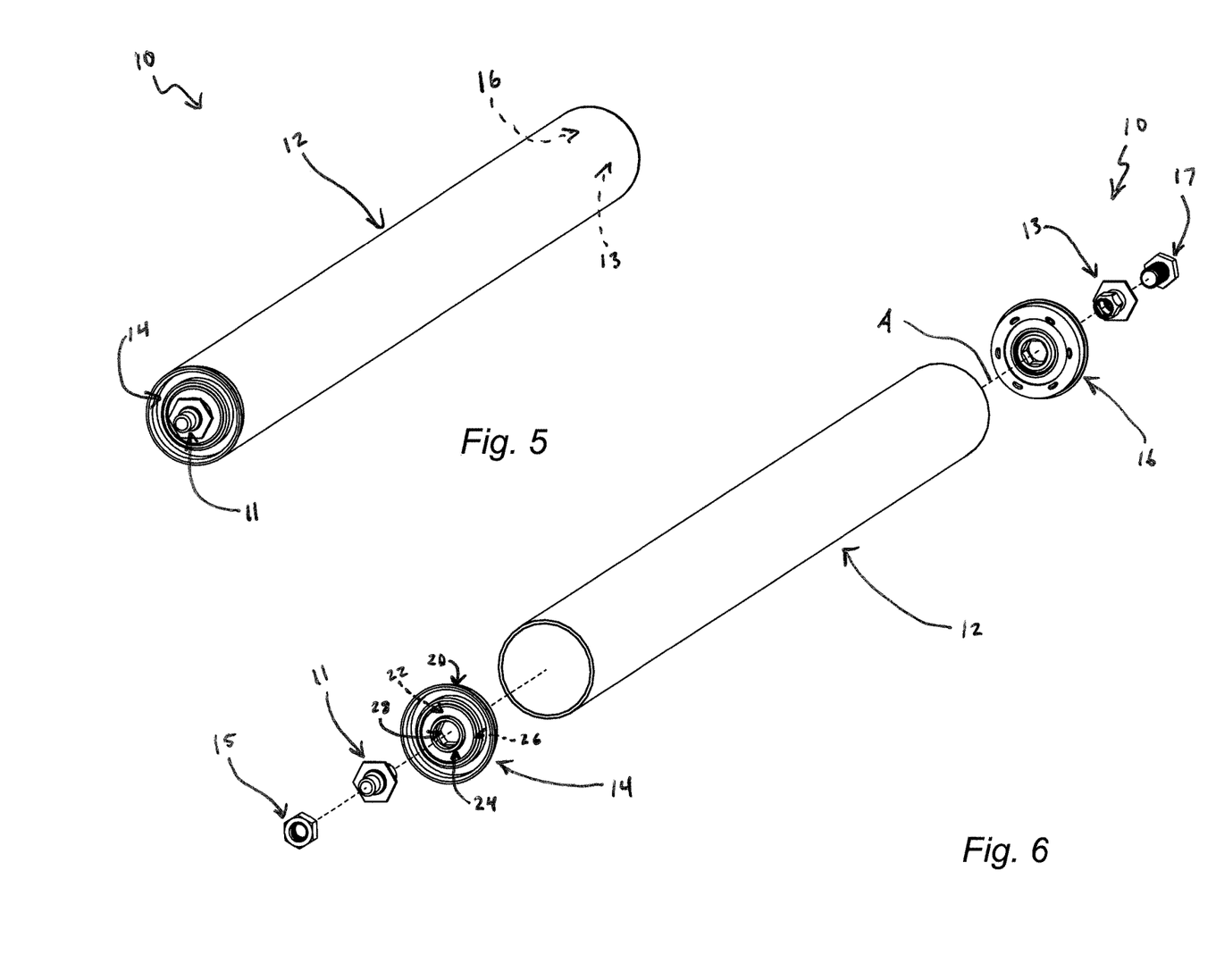
FIG. 5 is a perspective view of the roller of FIG. 2.
FIG. 6 is an exploded assembly view of the roller of FIG. 5 showing that the male and female stub axles extend into the bearings to support the roller on the frame.

Bearings 14, 16 are at least partially received in tube 12 of roller 10 as suggested in FIGS. 5 and 6. Each bearing 14, 16 includes a shell 20, an outer race 22, an inner race 24, and a plurality of balls 26 trapped between outer and inner races 22, 24. A receiver 28 is formed through inner race 24. Shell 20 engages with tube 12 (such as by a press fit or swage) to hold bearings 14, 16 on tube 12. Shell 20 and outer race 22 rotate with tube 12 about an axis A. In the illustrative embodiment, stub axles 11, 13 engage with receivers 28 to block rotation of inner race 24 about axis A.

Figure 7:
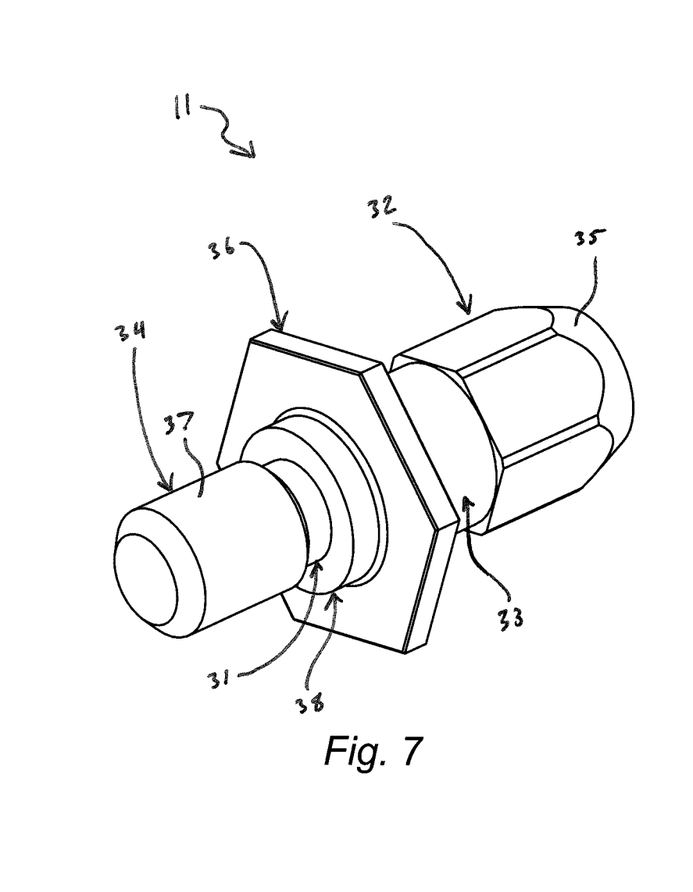
FIG. 7 is front perspective view of the male stub axle of FIG. 6 showing that the male stub axle includes a stem, a head, and a flange positioned between the stem and the head.
Figure 8:
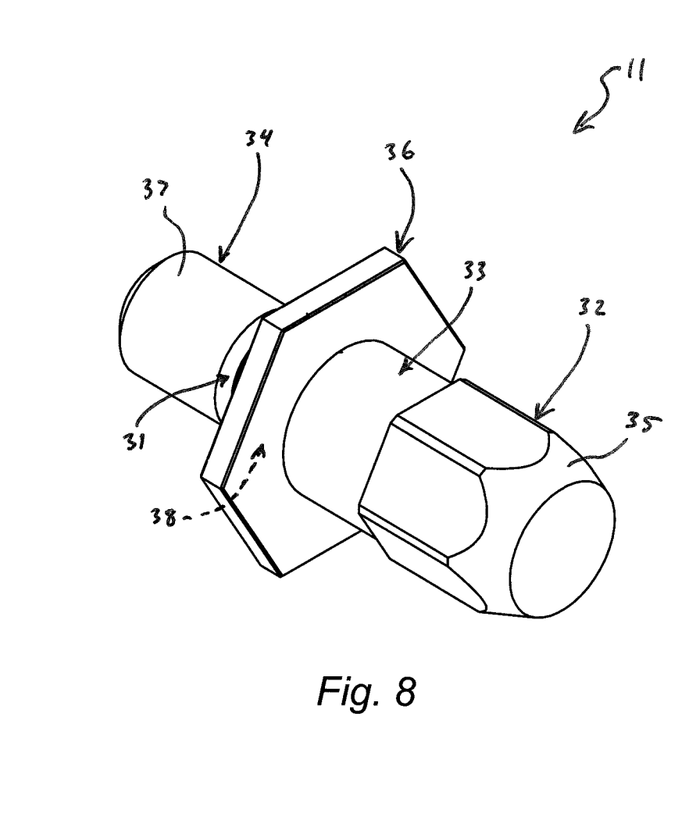
FIG. 8 is a rear perspective view of the male stub axle of FIG. 7.

Male stub axle 11 includes a first stem 32, a head 34, and a first flange 36 positioned between first stem 32 and head 34 as shown in FIGS. 7 and 8. First stem 32 has an outer profile (such as hexagonal or other polygonal shape) matching an inner profile of receiver 28 of bearing 14. In the illustrative embodiment, head 34 has a threaded surface 37 for engaging with fastener 15 to secure male stub axle 11 with frame 101. In some embodiments, other types of fasteners, such as rivets or push nuts, and engagement mechanisms, such as a bayonet fitting, can be used to secure male stub axle 11 with frame 101.

A locator 38 is coupled to first flange 36 and extends toward head 34 of male stub axle 11 as shown in FIG. 7. Locator 38 is configured to engage with hole 106 in rail 102 to locate male stub axle 11 relative to frame 101. A beveled end 35 of first stem 32 is configured to align male stub axle 11 with bearing 14 during insertion of first stem 32 into receiver 28. An outer profile of first flange 36 (such as hexagonal or other polygonal shape) allows a wrench or other tool to engage with male stub axle 11 to block rotation thereof while engaging head 34 with fastener 15 to secure male stub axle 11 with frame 101. In the illustrative embodiment, reliefs 31, 33 are formed in first stem 32 and head 34, respectively, for clearance with mating components.

Figure 9:
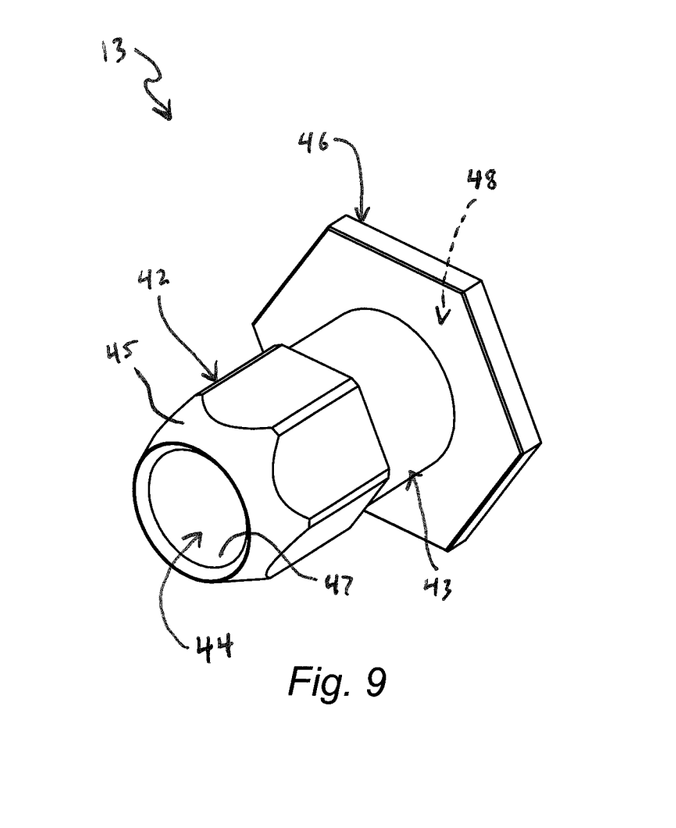
FIG. 9 is front perspective view of the female stub axle of FIG. 6 showing that the female stub axle includes a stem, a flange coupled to the stem, and a bore extending through the stem and the flange.
Figure 10:
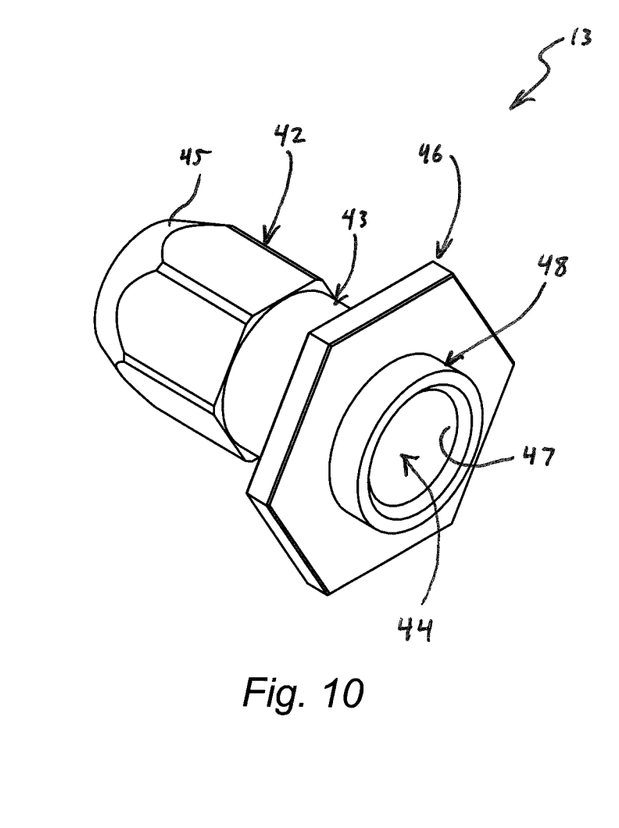
FIG. 10 is a rear perspective view of the female stub axle of FIG. 9.

Female stub axle 13 includes a second stem 42, a second flange 46 coupled to second stem 42, and a bore 44 extending through second stem 42 and second flange 46 as shown in FIGS. 9 and 10. Second stem 42 has an outer profile (such as hexagonal or other polygonal shape) matching an inner profile of receiver 28 of bearing 16. In the illustrative embodiment, bore 44 has a threaded surface 47 for engaging with fastener 17 to secure female stub axle 13 with frame 101. In some embodiments, other types of fasteners, such as rivets or push nuts, and engagement mechanisms, such as a bayonet fitting, can be used to secure female stub axle 13 with frame 101.

A locator 48 is coupled to second flange 46 and extends away from second stem 42 of female stub axle 13 as shown in FIG. 10. Locator 48 is configured to engage with hole 108 in rail 104 to locate female stub axle 13 relative to frame 101. A beveled end 45 of second stem 42 is configured to align female stub axle 13 with bearing 16 during insertion of second stem 42 into receiver 28. An outer profile of second flange 46 (such as hexagonal or other polygonal shape) allows a wrench or other tool to engage with female stub axle 13 to block rotation thereof while engaging fastener 17 with bore 44 to secure female stub axle 13 with frame 101. In the illustrative embodiment, a relief 43 is formed in second stem 42 for clearance with the mating component.

Figure 11:
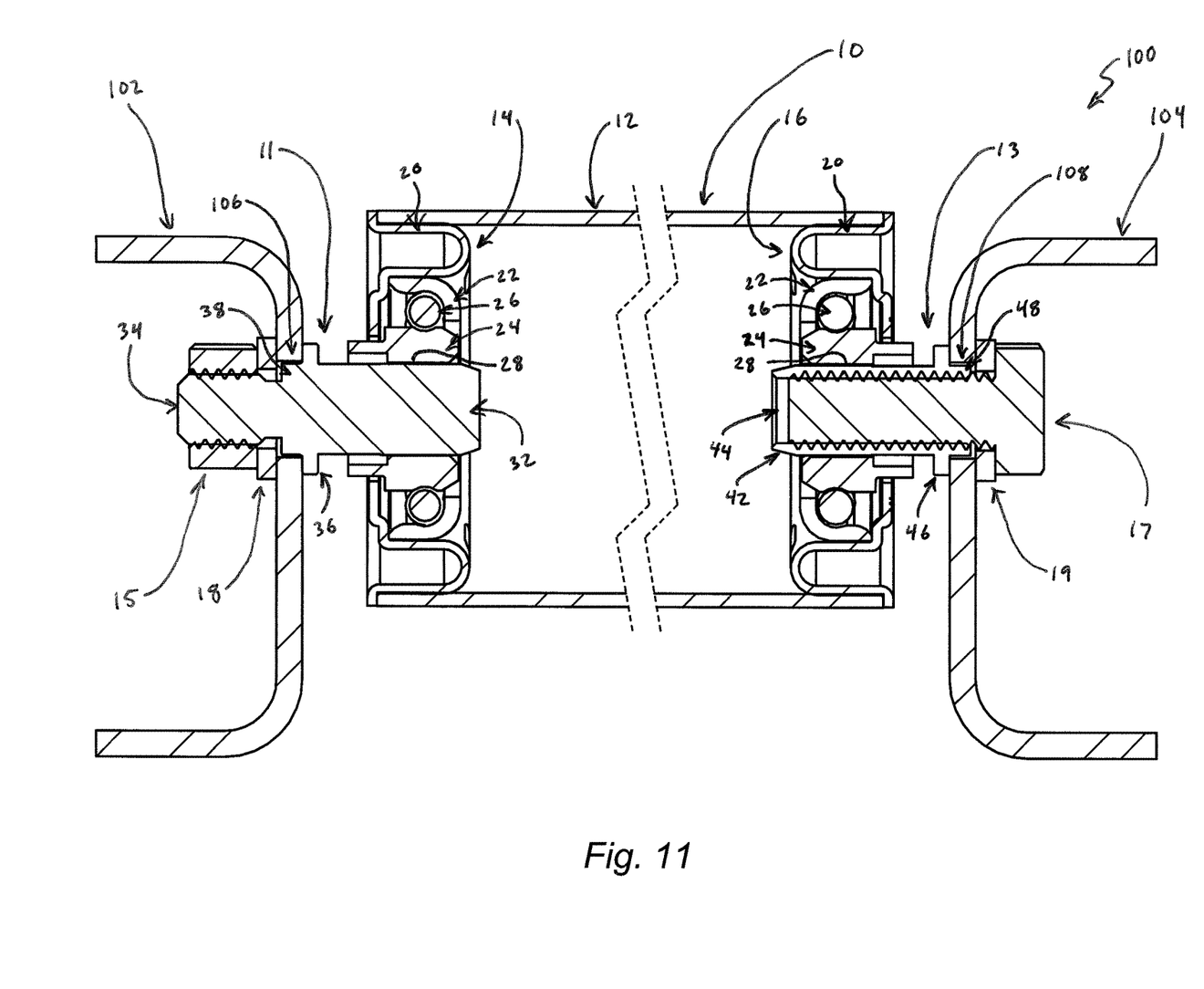
FIG. 11 is an enlarged view of the conveyor of FIG. 4 showing the male and female stub axles secured to the frame and received in the bearings for supporting the roller on the frame.

Head 34 extends through hole 106 to engage with fastener 15 to secure male stub axle 11 on rail 102 as suggested in FIG. 11. In the illustrative embodiment, a holding force between fastener 15 and first flange 36 on rail 102 blocks rotation of male stub axle 11 relative to frame 101. In some embodiments, a lock washer 18 is positioned between fastener 15 and rail 102. First stem 32 extends into receiver 28 of bearing 14 to support the related end of roller 10 on frame 101.

Fastener 17 extends through hole 108 to engage with bore 44 to secure female stub axle 13 on rail 104 as suggested in FIG. 11. In the illustrative embodiment, a holding force between fastener 17 and second flange 46 on rail 104 blocks rotation of female stub axle 13 relative to frame 101. In some embodiments, a lock washer 19 is positioned between fastener 17 and rail 104. Second stem 42 extends into receiver 28 of bearing 16 to support the related end of roller 10 on frame 101.

Stub axles 11, 13 according to the present disclosure allow simple and efficient mounting and dismounting of rollers 10 onto frame 101. Some other rollers include a single elongated axle that supports both ends of the roller on a frame, but installation of such rollers are burdensome and the elongated axle adds weight. Still other rollers use shorter, spring loaded axles coupled to the bearings of the roller, but these spring loaded axles are complex and more expensive than rollers without spring loaded axles. Still other rollers use shortened axles that are integrated with the bearings and are cumbersome to install. Stub axles 11, 13 according to the present disclosure have no moving components and are simple to manufacture, which allows them to be provided at lower cost. Stub axles 11, 13 are also easily replaceable and exchangeable during maintenance and repair of conveyor 100.

The axles of some other rollers are loosely fit into holes in the frame of the conveyor. In accordance with illustrative embodiments of the present disclosure, stub axles 11, 13 are securely fastened to frame 101 leading to less wear on frame 101, noise reduction, and anti-vibration benefits. Stub axles 11, 13 also minimize deflection to provide increased load capacity to rollers 10.

While the present disclosure describes various exemplary embodiments, the disclosure is not so limited. To the contrary, the disclosure is intended to cover various modifications, uses, adaptations, and equivalent arrangements based on the principles disclosed. Further, this application is intended to cover such departures from the present disclosure as come within at least the known or customary practice within the art to which it pertains. It is envisioned that those skilled in the art may devise various modifications and equivalent structures and functions without departing from the spirit and scope of the disclosure as recited in the following claims. The scope of the following claims is to be accorded the broadest interpretation to encompass all such modifications and equivalent structures and functions.

What is claimed is:

1. A mounting kit for use with a roller of a conveyor, the mounting kit comprising:
    a first stub axle comprising:
        a first stem;
        a head; and
        a first flange positioned between the first stem and the head, the first stem, head, and first flange being unitary and integral with one another; and
    a second stub axle comprising:
        a second stem;
        a second flange; and
        a bore extending through the second stem and the second flange, the second stem and second flange being unitary and integral with one another,
    wherein the first stem is configured to engage with a first bearing of the roller and the head is configured to extend through a frame of the conveyor to engage with a first fastener and support a first end of the roller on the frame for rotation relative to the frame, and the second stem is configured to engage with a second bearing of the roller and the bore is configured to receive a second fastener extending through the frame of the conveyor to support a second end of the roller on the frame for rotation relative to the frame.

2. The mounting kit of claim 1, wherein the head of the first stub axle has an outer threaded surface, and wherein the first fastener is a nut having an inner threaded surface configured to engage with the threaded surface of the head to secure the first stub axle with the frame.

3. The mounting kit of claim 1, wherein the first stub axle further includes a first locator coupled to the first flange and extending toward the head, wherein the first locator is configured to engage with a first hole in the frame to locate the first stub axle relative to the frame, wherein the second stub axle further includes a second locator coupled to the second flange and extending away from the second stem, and wherein the second locator is configured to engage with a second hole in the frame to locate the second stub axle relative to the frame.

4. The mounting kit of claim 3, wherein the first and second locators are cylindrical.

5. The mounting kit of claim 3, wherein the first stub axle is formed to include a relief positioned between the first locator and the head.

6. The mounting kit of claim 1, wherein the first stem includes a first engaging portion having a polygonal outer profile for engagement with the first bearing and a relief portion having a cylindrical outer profile positioned between the first flange and the first engaging portion, and wherein the second stem includes a second engaging portion having a polygonal outer profile for engagement with the second bearing and a relief portion having a cylindrical outer profile positioned between the second flange and the second engaging portion.

7. The mounting kit of claim 1, wherein the first and second flanges each have polygonal outer profiles configured to engage with a tool to block rotation of the first and second stub axles relative to the tool.

8. A roller for a conveyor, the roller comprising:
    a tube;
    a first bearing coupled to one end of the tube and a second bearing coupled to an opposing end of the tube;
    a male stub axle including a first stem, a head, and a first flange positioned between the first stem and the head, the first stem, head, and first flange being unitary and integral with one another, the first stem engaged with the first bearing; and
    a female stub axle including a second stem, a second flange coupled to the second stem, and a bore extending through the second stem and the second flange, the second stem and second flange being unitary and integral with one another, the second stem engaged with the second bearing,
    wherein the head is configured to extend through a frame of the conveyor to engage with a first fastener and support a first end of the roller on the frame for rotation relative to the frame, and the bore is configured to receive a second fastener extending through the frame of the conveyor to support a second end of the roller on the frame for rotation relative to the frame.

9. The roller of claim 8, wherein the head of the male stub axle has an outer threaded surface, and wherein the first fastener is a nut having an inner threaded surface configured to engage with the threaded surface of the head to secure the male stub axle with the frame.

10. The roller of claim 8, wherein the male stub axle further includes a first locator coupled to the first flange and extending toward the head, wherein the first locator is configured to engage with a first hole in the frame to locate the male stub axle relative to the frame, wherein the female stub axle further includes a second locator coupled to the second flange and extending away from the second stem, and wherein the second locator is configured to engage with a second hole in the frame to locate the female stub axle relative to the frame.

11. The roller of claim 10, wherein the first and second locators are cylindrical.

12. The roller of claim 10, wherein the male stub axle is formed to include a relief positioned between the first locator and the head.

13. The roller of claim 8, wherein the first stem includes a first engaging portion having a polygonal outer profile for engagement with the first bearing and a relief portion having a cylindrical outer profile positioned between the first flange and the first engaging portion, and wherein the second stem includes a second engaging portion having a polygonal outer profile for engagement with the second bearing and a relief portion having a cylindrical outer profile positioned between the second flange and the second engaging portion.

14. The roller of claim 8, wherein the first and second flanges each have polygonal outer profiles configured to engage with a tool to block rotation of the male and female stub axles relative to the tool.

15. A conveyor comprising:
    a frame; and a plurality of rollers coupled to the frame, each roller comprising:
  a tube;
  a first bearing coupled to one end of the tube and a second bearing coupled to an opposing end of the tube;
  a male stub axle including a first stem, a head, and a first flange positioned between the first stem and the head, the first stem, head, and first flange being unitary and integral with one another, the first stem engaged with the first bearing; and
  a female stub axle including a second stem, a second flange coupled to the second stem, and a bore extending through the second stem and the second flange, the second stem and second flange being unitary and integral with one another, the second stem engaged with the second bearing,
  wherein the head of the male stub axle extends through the frame to support the first bearing relative to the frame, a fastener extends through the frame into the bore of the female stub axle to support the second bearing relative to the frame, and the first and second bearings are configured to allow rotation of the tube relative to the frame.

16. The conveyor of claim 15, wherein the head of the male stub axle has an outer threaded surface, and wherein the first fastener is a nut having an inner threaded surface configured to engage with the threaded surface of the head to secure the male stub axle with the frame.

17. The conveyor of claim 15, wherein the male stub axle further includes a first locator coupled to the first flange and extending toward the head, wherein the first locator is configured to engage with a first hole in the frame to locate the male stub axle relative to the frame, wherein the female stub axle further includes a second locator coupled to the second flange and extending away from the second stem, and wherein the second locator is configured to engage with a second hole in the frame to locate the female stub axle relative to the frame.

18. The conveyor of claim 17, wherein the first and second locators are cylindrical.

19. The conveyor of claim 17, wherein the male stub axle is formed to include a relief positioned between the first locator and the head.

20. The conveyor of claim 15, wherein the first stem includes a first engaging portion having a polygonal outer profile for engagement with the first bearing and a relief portion having a cylindrical outer profile positioned between the first flange and the first engaging portion, and wherein the second stem includes a second engaging portion having a polygonal outer profile for engagement with the second bearing and a relief portion having a cylindrical outer profile positioned between the second flange and the second engaging portion.

21. The conveyor of claim 15, wherein the first and second flanges each have polygonal outer profiles configured to engage with a tool to block rotation of the male and female stub axles relative to the tool.

* * * * *